United States Patent
Harr (10) Patent No.: US 12,442,154 B2
(45) Date of Patent: Oct. 14, 2025

(54) ROTATOR FOR A TOOL

(71) Applicant: Indexator Rotator Systems AB, Vindeln (SE)

(72) Inventor: Joakim Harr, Vindeln (SE)

(73) Assignee: Indexator Rotator Systems AB, Vindeln (SE)

( * ) Notice: Subject to any disclaimer, the term of this patent is extended or adjusted under 35 U.S.C. 154(b) by 586 days.

(21) Appl. No.: 17/914,906

(22) PCT Filed: Mar. 29, 2021

(86) PCT No.: PCT/SE2021/050278
§ 371 (c)(1),
(2) Date: Sep. 27, 2022

(87) PCT Pub. No.: WO2021/206608
PCT Pub. Date: Oct. 14, 2021

(65) Prior Publication Data
US 2023/0138156 A1 May 4, 2023

(30) Foreign Application Priority Data
Apr. 8, 2020 (SE) .................................. 2050403-1

(51) Int. Cl.
*E02F 3/36* (2006.01)
*B66C 3/00* (2006.01)
*B66C 13/16* (2006.01)

(52) U.S. Cl.
CPC ............ *E02F 3/3681* (2013.01); *B66C 3/005* (2013.01); *B66C 13/16* (2013.01)

(58) Field of Classification Search
CPC ......... E02F 3/3681; B66C 3/005; B66C 13/16
See application file for complete search history.

(56) References Cited

U.S. PATENT DOCUMENTS

| 3,966,249 A | 6/1976 | Lindqvist |
| 2004/0131483 A1 | 7/2004 | Voulgaris |
| 2014/0030008 A1* | 1/2014 | Harr ...................... B66C 3/005 403/164 |
| 2018/0297823 A1 | 10/2018 | Steindl |

FOREIGN PATENT DOCUMENTS

| CA | 3049832 A1 * | 9/2018 | ............ B66C 23/62 |
| DE | 10 2008 035 088 A1 | 2/2010 | |
| SE | 1001111 A1 | 6/2012 | |

(Continued)

*Primary Examiner* — Tara Mayo
(74) *Attorney, Agent, or Firm* — Blank Rome LLP (57) ABSTRACT

The invention relates to a rotator (100) for a tool (200). The rotator (100) comprises a stator (102) and a rotor (104) rotatably arranged inside the stator (102). The rotor (104) comprises a radial bearing (122) having a first axial extension (a1) in the rotator (100). The rotator (100) comprises a separate bearing (112) arranged radially outside the rotor (104). The separate bearing (112) is configured to carry an external load of the rotator (100). The rotator (100) further comprises an electrical swivel (108) and/or an angle meter (116) arranged inside the rotor (102), and the electrical swivel (108) and/or the angle meter (116) at least partially extends axially in the first axial extension (a1) in the rotator (100). Thereby, a compact rotator design is provided.

11 Claims, 7 Drawing Sheets

(56) References Cited

FOREIGN PATENT DOCUMENTS

| SE | 1750714 A1 | 3/2018 |
|---|---|---|
| WO | WO 03/057615 A1 | 7/2003 |
| WO | WO 03/082725 A1 | 10/2003 |
| WO | WO 2012/134370 A1 | 10/2012 |
| WO | WO 2018/038675 A1 | 3/2018 |
| WO | WO 2018/162424 A1 | 9/2018 |

* cited by examiner

ROTATOR FOR A TOOL

TECHNICAL FIELD

The invention relates to a rotator for a tool, such as a jib-carried tool.

BACKGROUND

Between a crane arm tip and a jib-carried tool, a rotator can be arranged so that the tool can be rotated in respect to the crane arm tip. A grapple is an example of a tool and another non-limiting example of a jib-carried tool is a harvester for harvesting trees. The crane system often comprises two or three crane arm parts connected to each other by crane arm joints.

Rotators come in a number of different types and the most common types are electric and hydraulic rotators. This means that the first type is electrically powered whilst the latter type is powered by hydraulic fluid. Rotators are used all over the world besides in forestry, such as in general cargo handling and material handling in ports and scrap yards.

SUMMARY

An objective of embodiments of the invention is to provide a solution which mitigates or solves the drawbacks and problems of conventional solutions.

Another objective of embodiments of the invention is to provide a rotator having a compact design in its axial extension.

The above and further objectives are solved by the subject matter of the independent claims. Further advantageous embodiments of the invention can be found in the dependent claims.

According to a first aspect of the invention, the above mentioned and other objectives are achieved with a rotator for a tool, the rotator comprising:
  a stator;
  a rotor rotatably arranged inside the stator, the rotor comprising a radial bearing having a first axial extension in the rotator;
  a separate bearing arranged radially outside the rotor, the separate bearing being configured to carry an external load of the rotator; and
  an electrical swivel and/or an angle meter arranged inside the rotor, wherein the electrical swivel and/or the angle meter at least partially extends axially in the first axial extension in the rotator.

Hence, the rotator may comprise an electrical swivel, an angle meter, or an electrical swivel and an angle meter.

That the electrical swivel and/or an angle meter at least partially extends axially in the first axial extension can be understood that the said electrical swivel and/or an angle meter has at least one part/section that extends or is inside the first axial extension but can have another parts/section that does not extend or is inside the first axial extension.

The tool may be a jib-carried tool.

The rotator is in embodiments a hydraulic rotator.

The rotator has an extension in its axial direction and an extension in its radial direction. The axial direction may be parallel to or the same as the axis of rotation of the rotator.

The separate bearing may be a bearing separate from the bearing of the rotor. That the separate bearing is configured to carry an external load of the rotator can be understood as that the separate bearing carries a load generated by the tool and possible object(s) held by the tool and possible dynamic forces generated by movement of the tool and its possible object(s), e.g. due to movement of the crane to which the rotator is attached.

An advantage of the rotator according to the first aspect is that the rotator can be made or designed compact in its axial extension. Therefore, the rotator has a low building height. This implies that the tool and its possible object may be lifted higher compared to when the rotator has a higher building height.

Further, the separate bearing implies that the rotator can carry very heavy external loads in contrast to a rotator in which the external load is carried by the rotor.

Moreover, since the electrical swivel and/or the angle meter is arranged inside the rotator said electrical swivel and/or the angle meter are well protected, e.g. from mechanical impact.

In embodiments, at least one of the electrical swivel and the angle meter extends fully in the first axial extension which can be understood that at least one of the electrical swivel and the angle meter does not have an axial extension outside the first axial extension.

In an implementation form of a rotator according to the first aspect, the separate bearing at least partially extends axially in the first axial extension in the rotator.

An advantage with this implementation form is that the rotator can be made even more compact in its axial extension.

In an implementation form of a rotator according to the first aspect, the rotator comprises
  one or more hydraulic chambers arranged between the rotor and the stator, each hydraulic chamber having a second axial extension in the rotator, wherein the second axial extension is less than the first axial extension; and wherein
  the electrical swivel and/or the angle meter at least partially extends axially in the second axial extension in the rotator.

The second axial extension is in embodiments of the invention within the first axial extension in the rotator.

The one or more hydraulic chambers can be part of a hydraulic motor configured to rotate the rotor in the stator. Examples of hydraulic motors are hydraulic vane motors and hydraulic piston motors.

An advantage with this implementation form is that the rotator can be made even more compact in its axial extension.

In an implementation form of a rotator according to the first aspect, the separate bearing at least partially extends axially in the second axial extension in the rotator.

An advantage with this implementation form is that the rotator can be made even more compact in its axial extension.

In an implementation form of a rotator according to the first aspect, the rotator comprises
  a hydraulic swivel arranged inside the rotor; and wherein
  the hydraulic swivel at least partially extends axially in the first axial extension in the rotator.

An advantage with this implementation form that a hydraulic swivel is provided which can be configured to hydraulically feed a tool coupled to the rotator. Further, the rotator comprising a hydraulic swivel can be made compact in its axial extension.

In an implementation form of a rotator according to the first aspect, the hydraulic swivel at least partially extends axially in the second axial extension in the rotator.

An advantage with this implementation form is that the rotator can be made even more compact in its axial extension.

In an implementation form of a rotator according to the first aspect, the rotator comprises the electrical swivel and the angle meter; and wherein the angle meter is arranged axially above the electrical swivel inside the rotor.

It is noted that one or more electrical power cables and/or one or more electrical signal cables may be arranged to pass though the angle meter to the electrical swivel in such an implementation form.

An advantage with this implementation form is that electrical swivel may more easily feed the tool with electrical power since it is arranged closer to the tool than the angle meter.

In an implementation form of a rotator according to the first aspect, the electrical swivel and the angle meter are axially aligned with each other inside the rotor along an axis of rotation of the rotator.

An advantage with this implementation form is that the radial extension of the rotator can be made smaller since the electrical swivel and the angle meter shares the same axis of rotation.

In an implementation form of a rotator according to the first aspect, the electrical swivel and the angle meter are arranged in a common housing inside the rotor.

An advantage with this implementation form is easier mounting of the electrical swivel and the angle meter in the rotor. This also means easier dismounting of the electrical swivel and the angle meter, e.g. for service or repair. Further, by having a common housing the electrical swivel and the angle meter are better protected from hydraulic fluid due to a more seamless protective design of the common housing. The common housing also provides a cost-effective solution.

In an implementation form of a rotator according to the first aspect, the hydraulic swivel is arranged axially above the electrical swivel and/or the angle meter inside the rotor.

In an implementation form of a rotator according to the first aspect, the hydraulic swivel is axially aligned with the electrical swivel and/or the angle meter inside the rotor along an axis of rotation of the rotator.

An advantage with this implementation form is that the radial extension of the rotator can be made smaller since the hydraulic swivel shares the same axis of rotation with the electrical swivel and the angle meter.

In an implementation form of a rotator according to the first aspect, the rotator comprises a hydraulic conduit extending inside the rotor from the hydraulic swivel to a hydraulic coupling arranged on an underside of the rotator.

The hydraulic conduit may extend radially outside of the electrical swivel and/or the angle meter inside the rotor.

An advantage with this implementation form is that it is possible to arrange the electrical swivel and/or the angle meter in the centre of the rotor and still have a low building height of the rotator.

In an implementation form of a rotator according to the first aspect, the rotator comprises torque transfer means arranged radially around a section of the rotor which axially extends outside of the stator.

An advantage with this implementation form is that the torque transfer means transfers load such that the loads at the bearings between the stator and the rotor are mitigated.

In an implementation form of a rotator according to the first aspect, the section of the rotor axially extends outside of the stator in the lower part of the rotator.

Aspects of the invention also relates to an arrangement comprising a rotator according to embodiments of the invention and a jib-carried tool.

Further applications and advantages of the embodiments of the invention will be apparent from the following detailed description.

BRIEF DESCRIPTION OF THE DRAWINGS

The appended drawings are intended to clarify and explain different embodiments of the invention in which.

DETAILED DESCRIPTION

Figure 9:
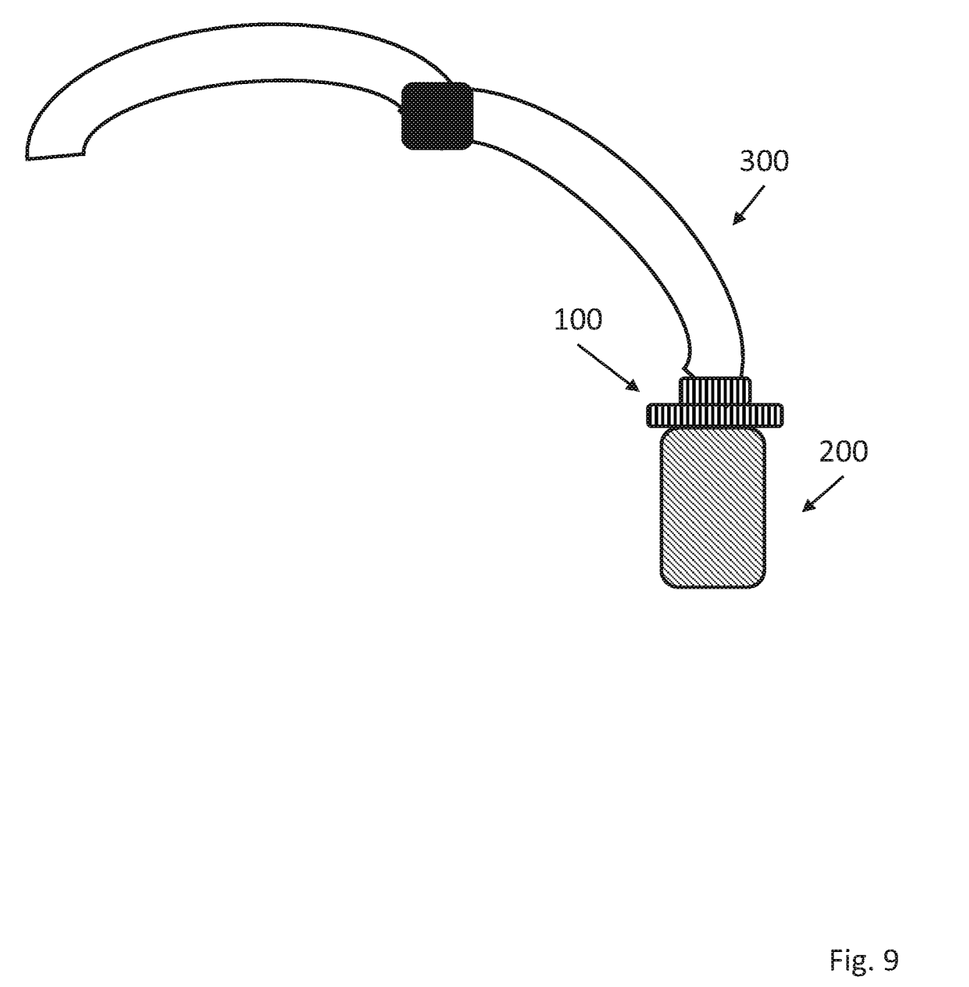
FIG. 9 illustrates an arrangement of crane arms, a rotator and a jib-carried tool.

FIG. 9 shows an example of a crane arm 300 and a rotator 100 attached to the crane arm 300, e.g. via a universal joint/coupling also known as a cardan joint/coupling. A jib-carried tool 200 in the form of a harvester for harvesting trees is attached to the rotator 100. A grapple is another non-limiting example of a jib-carried tool. Other types of tools can also be used.

The tool and possible objects held by the tool makes up an external load which is to be carried by the rotator. Non-limiting examples are a harvester carrying a log, and a grapple and metal scrap.

Figure 1:
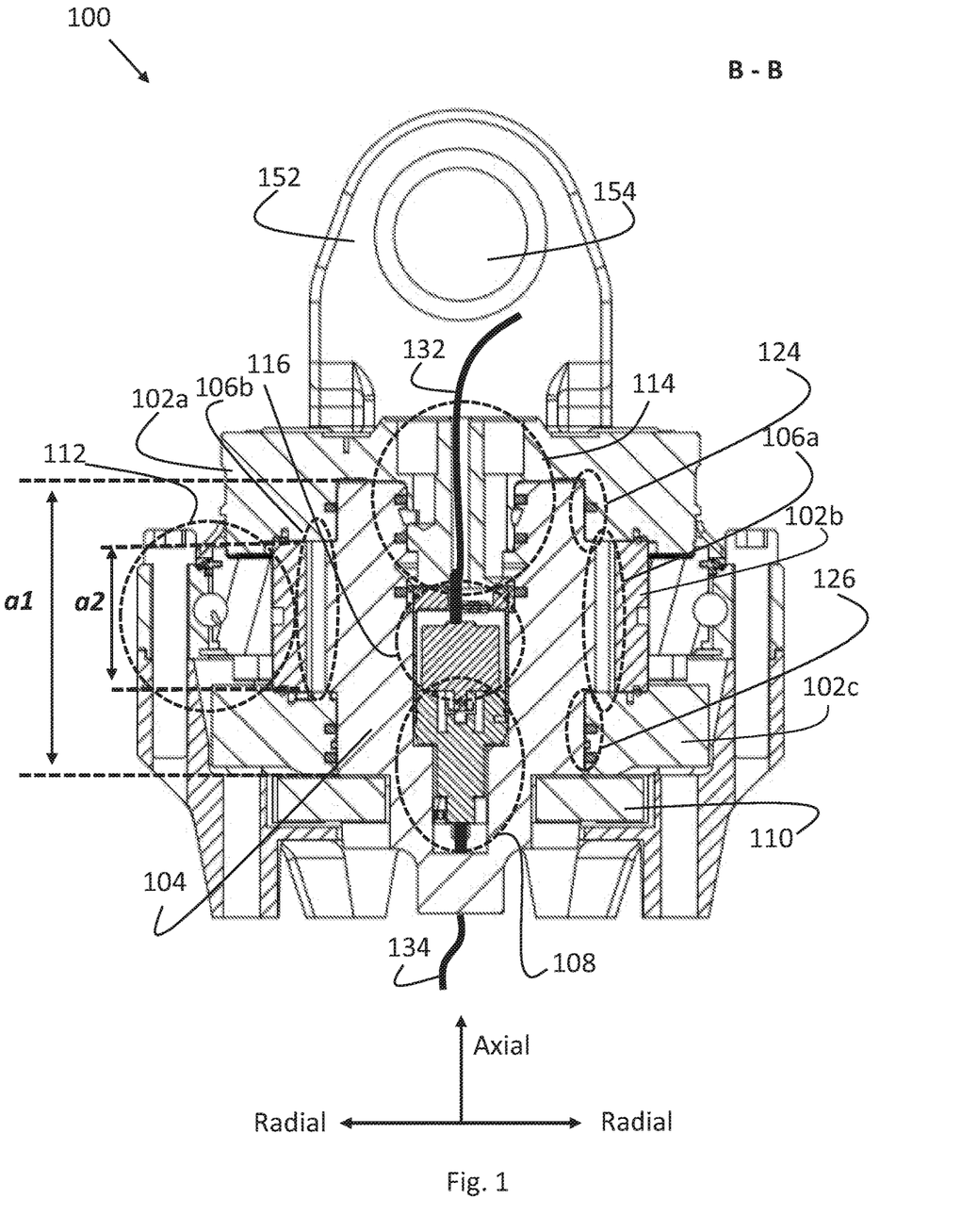
FIG. 1 shows a rotator in a first cross section view B-B according to an embodiment of the invention.
Figure 2:
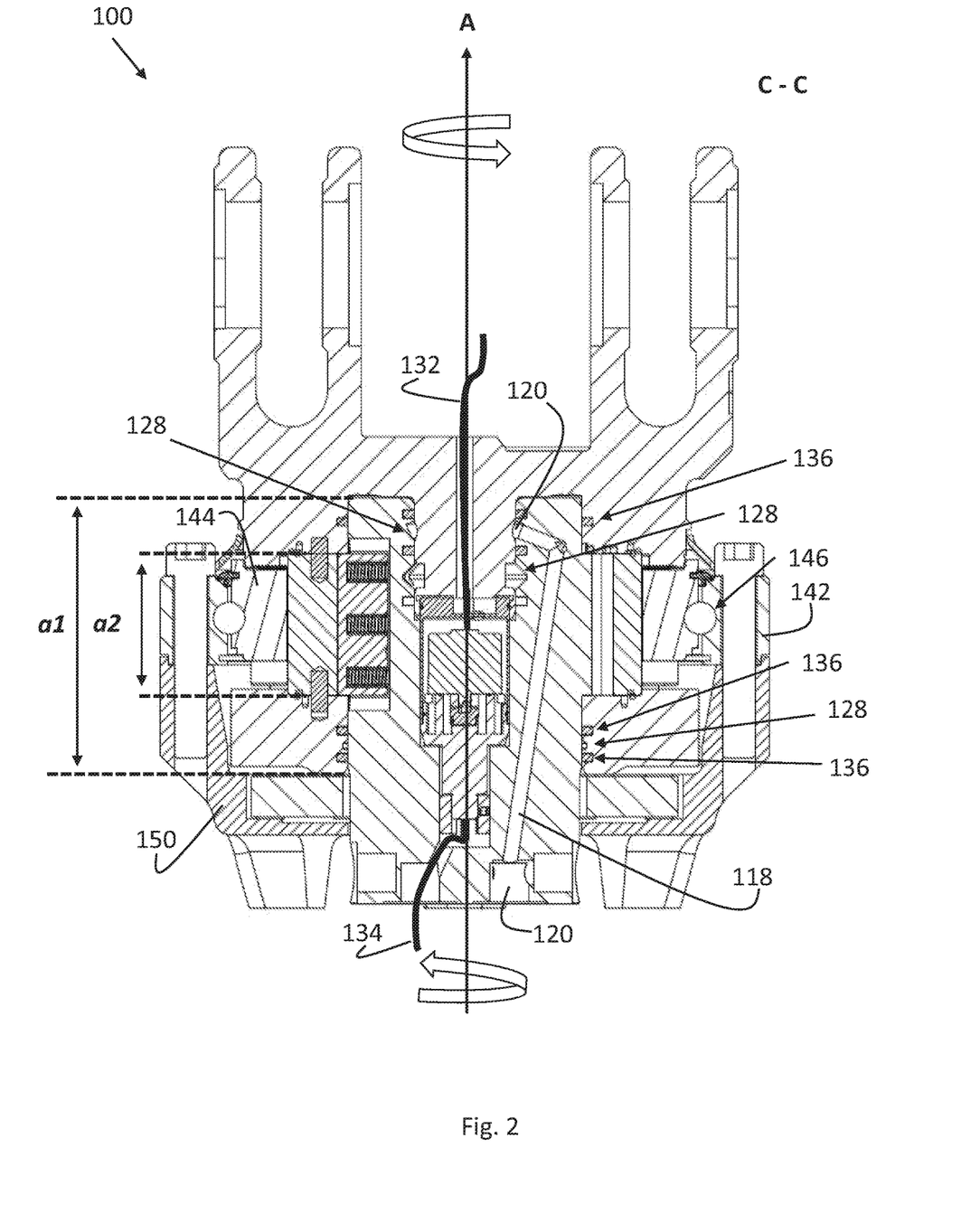
FIG. 2 shows the rotator in FIG. 1 in a second cross section view C-C which is perpendicular to the first cross section view.

With reference to FIGS. 1 and 2 a rotator 100 for a tool according to embodiments of the invention are herein disclosed. The rotator 100 is in FIG. 1 shown in a first cross section view in a first line B-B whilst in FIG. 2 shown in a second cross section view in a second line C-C. The rotator 100 has an axial extension and a radial extension as illustrated in FIG. 1.

The rotator 100 comprises a stator 102 and a rotor 104 which is rotatably arranged inside the stator 102. The rotor 104 comprising a radial bearing 122 having a first axial extension a1 in the rotator 100 as shown in FIG. 1. The rotator 100 further comprises a separate bearing 112 arranged radially outside the rotor 104 and the separate bearing 112 is configured to carry an external load of the rotator 100. The rotator 100 further comprises an electrical swivel 108 and/or an angle meter 116 arranged inside the rotor 104. The electrical swivel 108 and/or the angle meter 116 at least partially extends axially in the first axial extension a1 in the rotator 100. Thereby, a compact rotator is provided having a low building height, i.e. a low axial extension.

The electrical swivel 108 can herein be understood as a device or an arrangement that can provide electrical power at and through a rotational interface, e.g. between the stator 102 and the rotor 104. It is therefore also disclosed an upper electrical cable 132 and a lower electrical cable 134 connected to the electrical swivel 108. However, the rotator can comprise one or more upper electrical cables 132 and one or more lower electrical cables 134 even though only one is shown in the Figs. The electrical cables can be arranged for electrical power transfer or for communication.

The upper electrical cable 132 can hence be connected to a power source (not shown) which feeds electrical power or to a first communication device (not shown). The lower electrical cable 134 can be connected to one or more applications (not shown) in the tool 200 that consumes electrical power or arranged for electrical communication (e.g. via a CAN bus) in the form of one or more second communication devices (not shown) configured to communicate with one or more first communication devices. Non-limiting examples of such applications are processors, sensors, camera, etc.

The angle meter 116 can herein be understood as a device or an arrangement that indicates or provides a (relative) rotation between the rotor 104 and the stator 102. The rotation can be given in an angle hence the name of the device. The indication of the rotation or the angle can be used in a number of different applications. For example, the rotation or the angle can be used for controlling the rotator 100 itself. Another exemplary application is for controlling the tool 200. Yet another application is for controlling the crane arm 300. Yet another application is for controlling the machine or vehicle on which the crane arm is attached. Therefore, the angle meter 116 may be communicatively coupled to a control arrangement (not shown). The communication between the angle meter 116 and the control arrangement may be performed using wireless and/or wired communications according to known communication protocols. For example, conventional communication buses, such as CAN buses, may be used. Further, the angle meter 116 can be powered by the electrical swivel 108 via a power cable. Also, the electrical swivel 108 may provide one or more signal cables to the angle meter 116 for wired communications.

In embodiments of the invention, the stator 102 may comprise an upper stator part 102a, a lower stator part 102c and a stator ring 102b arranged between the upper stator part 102a and the lower stator part 102c as shown in FIG. 1. The stator ring 102b may comprise a cam curve of a hydraulic motor, such as a vane motor or a piston motor. The cam curve may define one or more hydraulic chambers of the hydraulic motor.

Furthermore, the radial bearing 122 of the rotor 104 is due to the fact that the rotor 104 has to be held in its position in relation to the axis of rotation A and the stator 102. The radial bearing 122 of the rotor may therefore comprise an upper radial bearing 124 which radially abuts the upper stator part 102a and a lower radial bearing 126 which radially abuts the lower stator part 102c which is also shown in the Figs.

The separate bearing 112 can be an arrangement having an outer ring 142 attached to a lower link 150 which is arranged to be attached to the tool 200. The separate bearing 112 has an inner ring 144 attached to the upper stator part 102a. In between the outer ring 142 and the inner ring 144 a ball bearing 146 is arranged. The separate bearing 112 can hence be a slewing bearing.

In embodiments of the invention, the separate bearing 112 is arranged axially between the upper radial bearing 124 and the lower radial bearing 126 of the rotor 104 as shown in FIGS. 1 and 2.

In embodiments of the invention, the separate bearing 112 at least partially extends axially in the first axial extension a1 in the rotator 100 which implies even more compact rotator 100 design in its axial extension.

In embodiments of the invention, the rotator 100 comprises one or more hydraulic chambers 106a, 106b, . . . , 106n arranged between the rotor 102 and the stator 102. In FIG. 1 two hydraulic chambers 106a, 106b are shown. Each hydraulic chamber 106n has a second axial extension a2 in the rotator 100 which is different from the first axial extension a1 and less than the first axial extension a1, i.e. shorter. In such embodiments the electrical swivel 108 and/or the angle meter 116 at least partially extends axially in the second axial extension a2 in the rotator 100. Thereby, an even more compact rotator design is provided.

Further, in embodiments of the invention, also the separate bearing 112 at least partially extends axially in the second axial extension a2 in the rotator 100 as shown in FIG. 1. Moreover, the separate bearing 112 may be arranged radially outside the one or more hydraulic chambers 106a, 106b, . . . , 106n which is also illustrated in FIG. 1. By having the separate bearing 112 radially outside the hydraulic chambers 106a, 106b, . . . , 106n a compact design can be provided.

The rotator 100 also comprises attachment means for attaching the rotator 100 to a crane arm. Many different attachment means are known and can be used and in the Figs. the attachment means are attachment ears 152 comprising through holes 154 through which the latter a coupling pin (not shown) may be inserted. The rotator 100 may also be attached to the crane arm via one or more links, such as a braking link, universal joint/coupling, etc.

Moreover, the rotator 100 comprises swivel channels 128 for providing hydraulic fluid to one or more hydraulic applications of the tool 200 and seals/gaskets 136 for sealing so as to prevent leakage of hydraulic fluid.

Figure 3:
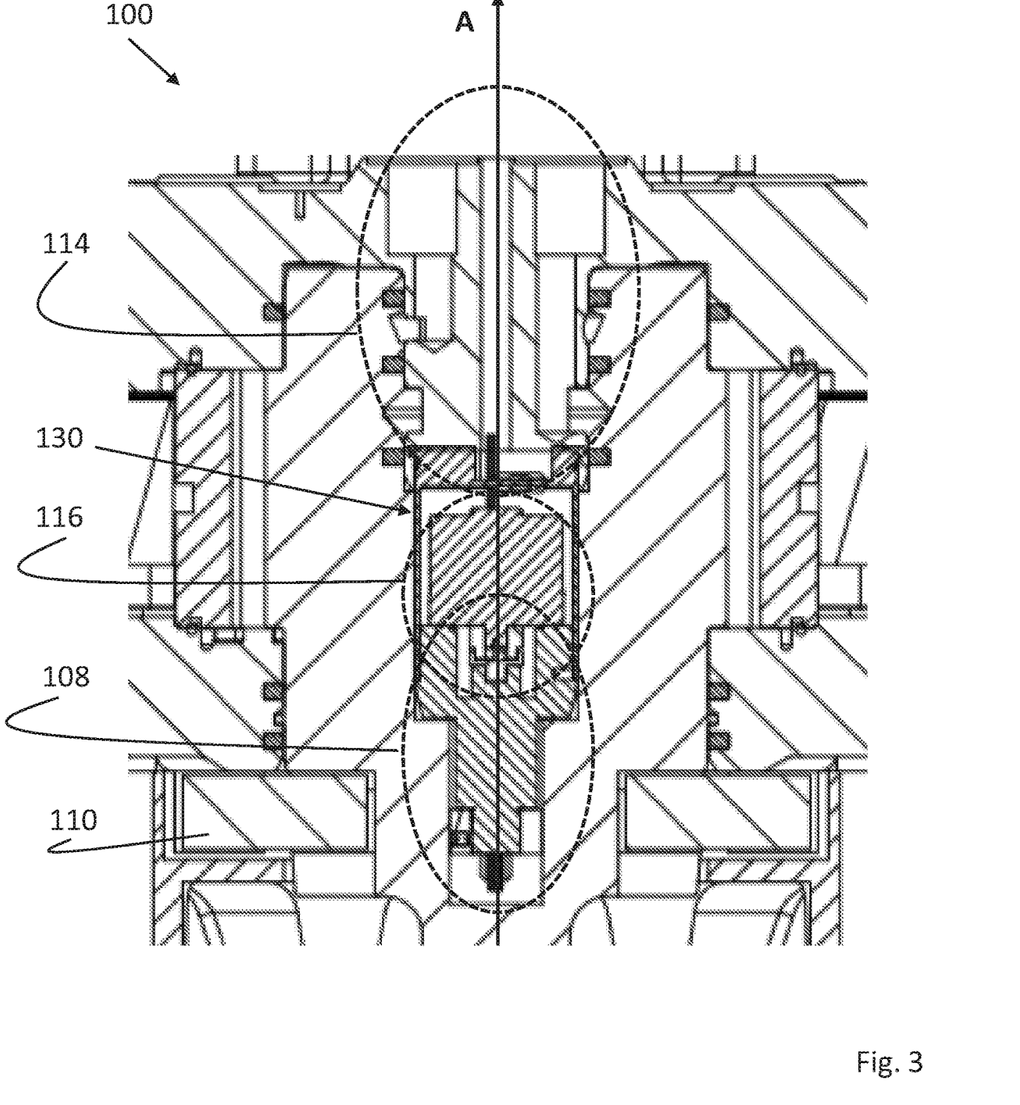
FIG. 3 shows a close up view of the rotator in the first cross section view.
Figure 4:
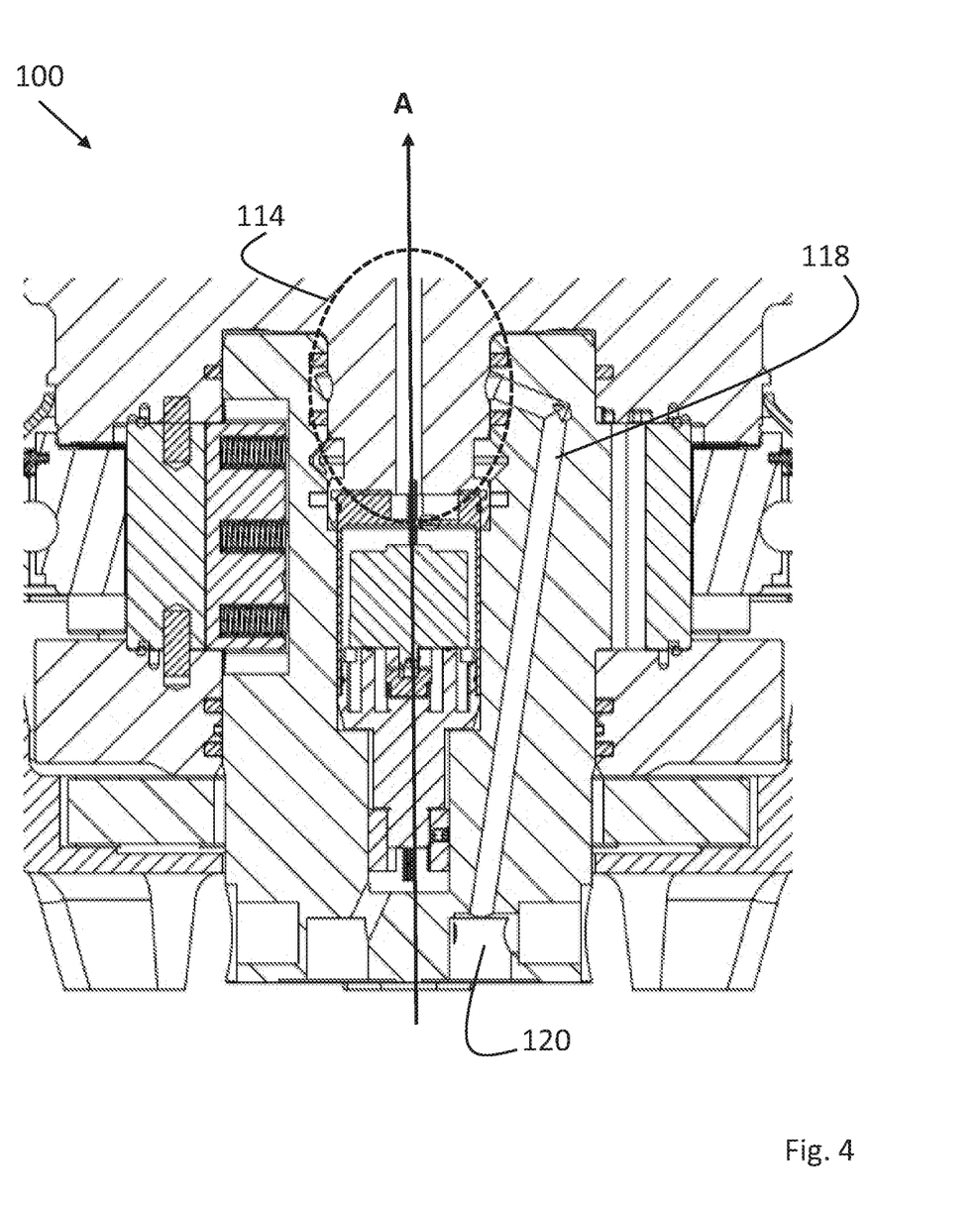
FIG. 4 shows a close up view of the rotator in the second cross section view.

FIGS. 3 and 4 shows a close up view of the rotator 100 in the first cross section view (B-B) and the second cross section view (C-C), respectively.

In embodiments of the invention and with reference to FIGS. 3 and 4, the rotator 100 further comprises a hydraulic swivel 114 which is arranged inside the rotor 104. The hydraulic swivel 114 also at least partially extends axially in the first axial extension a1 in the rotator 100. For even more compact design in embodiments of the invention the hydraulic swivel 114 at least partially extends axially in the second axial extension a2 in the rotator 100 since the second axial extension a2 is less than the first axial extension a1.

The hydraulic swivel 114 can herein be understood as a device or an arrangement that is arranged to provide hydraulic fluid to one or more hydraulic applications in the tool 200 at or through a rotational interface. Therefore, the hydraulic swivel 114 can have upper hydraulic conduit (not shown) connected to a hydraulic source which feeds hydraulic fluid and lower hydraulic conduit (see FIGS. 1 and 4) connected to the one or more hydraulic applications in the tool 200. Usually the rotator 100 also comprises hydraulic return conduits which is not shown in the Figs.

It should also be noted that the rotator 100 may comprise both the electrical swivel 108 and the angle meter 116 in the same application, i.e. in the same rotator 100. Therefore, in embodiments of the invention, the angle meter 116 may be arranged axially above the electrical swivel 108 inside the rotor 104 as disclosed in the Figs.

The electrical swivel 108 and the angle meter 116 may be axially aligned with each other inside the rotor 104 along the axis of rotation A of the rotator 100 which is illustrated in FIGS. 2-4. Said axis of rotation A can be considered as a centre axis around which the rotor 104 rotates inside the stator 102. The rotation can be clockwise and anti-clockwise.

As further noted from FIGS. 3 and 4, the electrical swivel 108 and the angle meter 116 may be arranged in a common housing 130 inside the rotor 104. The common housing 130 may be made of metal, plastic, or any other suitable material. The electrical swivel 108 and the angle meter 116 may also be axially aligned with each other inside the common housing 130. The angle meter 116 may by fully enclosed inside the common housing 130 whilst the electrical swivel 108 is partially arranged inside the common housing 130.

In embodiments not shown in the Figs. the rotator 100 may comprise an opening at the underside of the rotor 104. The opening may be connected to a hollow structure inside the rotor and the hollow structure may be arranged to receive the common housing 130 comprising the electrical swivel 108 and the angle meter 116 in operation. Therefore, the common housing 130 can be taken out of the rotor 104 through the opening for service and/or repair of the electrical swivel 108 and the angle meter 116 and thereafter put back. Hence, service and/or repair is made much easier with such design.

In case the rotator 100 comprises a hydraulic swivel 114 mentioned hydraulic swivel 114 may be axially arranged above the electrical swivel 108 and/or the angle meter 116 inside the rotor 104 which is shown in the Figs. Therefore, the hydraulic swivel 114 may also be axially aligned with the electrical swivel 108 and/or the angle meter 116 inside the rotor 104 along the axis of rotation A of the rotator 100.

Moreover, with reference to FIG. 4 the rotator 100 may comprises a hydraulic conduit 118 which extends inside the rotor 104 from the hydraulic swivel 114 to a hydraulic coupling 120 arranged on an underside of the rotator 100 closest to the tool 200. The hydraulic coupling 120 may be arranged to couple the hydraulic conduit 118 with one or more hydraulic hoses (not shown) arranged to feed one or more hydraulic applications in the tool 200.

Returning back to FIG. 3, the rotator 100 may also comprise torque transfer means 110 arranged radially around a section of the rotor 104 which axially extends outside of the stator 102. The torque transfer means 110 transfer load such that the loads at the bearings between the stator 102 and the rotor 104 are mitigated. The section of the rotor 104 axially extends outside of the stator 102 in the lower part of the rotator 100.

Figure 5:
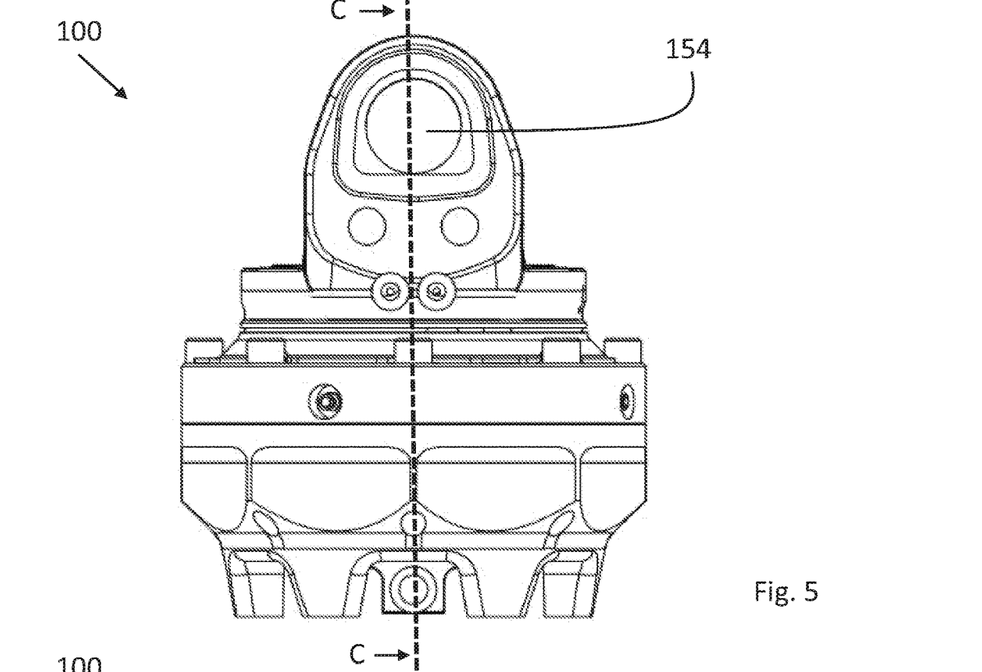
FIG. 5 shows the rotator in a first exterior view related to the first cross section view B-B.
Figure 6:
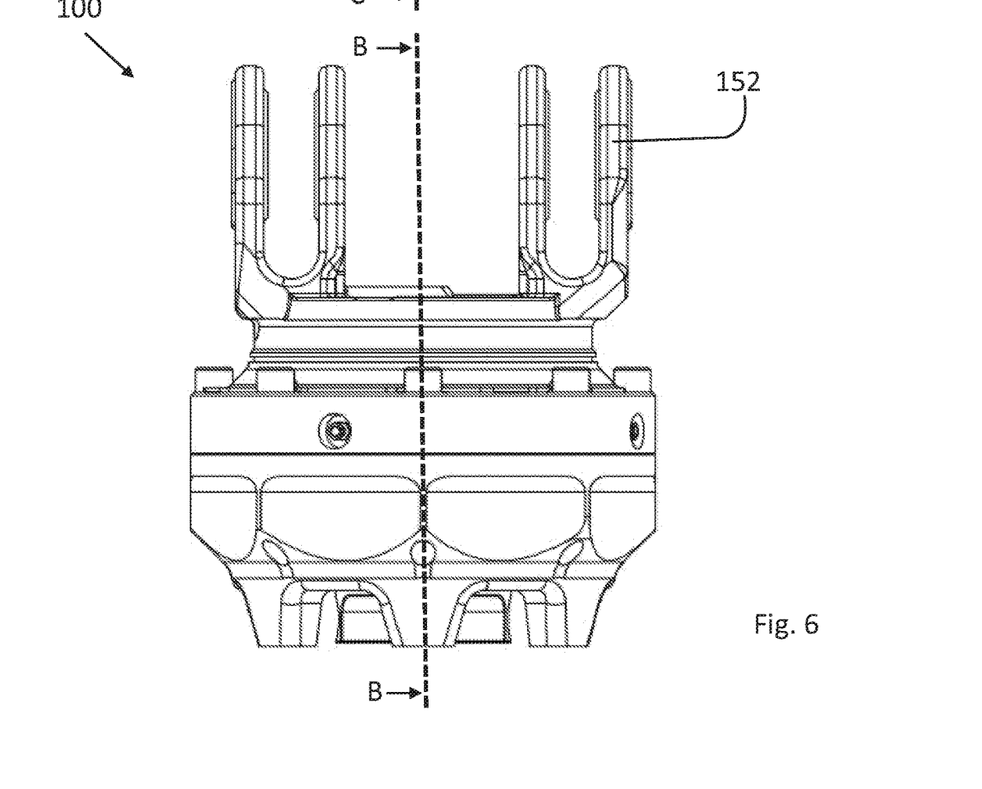
FIG. 6 shows the rotator in a second exterior view related to the second cross section view C-C.

FIGS. 5 and 6 shows the rotator 100 in a first exterior view related to the first cross section view (B-B) and in a second exterior view related to the second cross section view (C-C), respectively. The attachment means 152, 154 are clearly shown in FIGS. 5 and 6.

Figure 7:
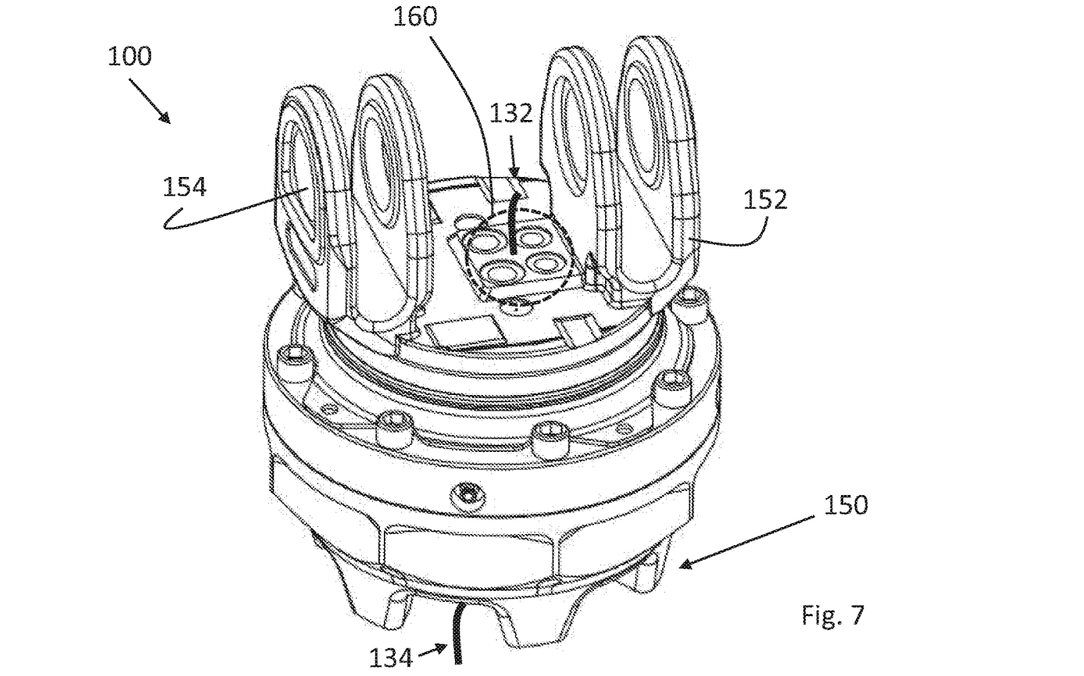
FIG. 7 shows the rotator in a first perspective view.
Figure 8:
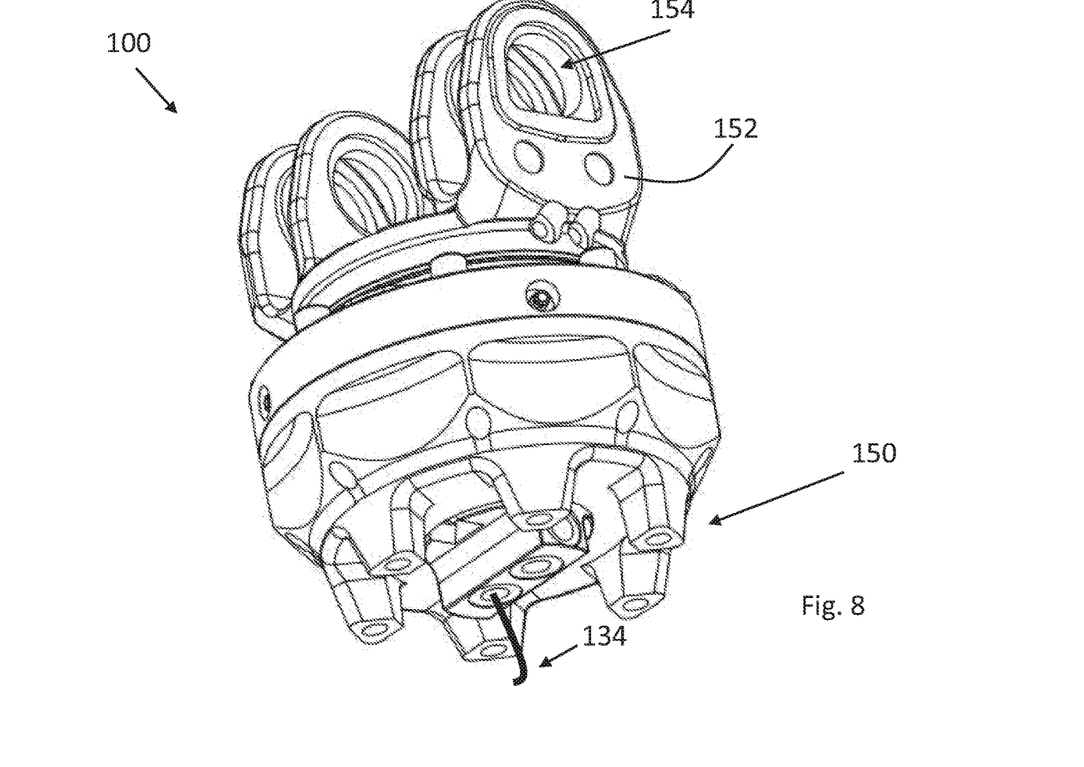
FIG. 8 shows the rotator in a second perspective view.

FIGS. 7 and 8 shows the rotator 100 in a first perspective view and a second perspective view respectively. The rotator 100 comprises attachment means for attaching a tool 200 to the rotator 100. Said attachment means may be a lower link 150 as previously explained but is not limited thereto. The lower link 150 may comprise receiving means for receiving bolts and thereby being attaching the tool 200 to the rotator 100.

FIG. 7 also shows an arrangement of hydraulic couplings 160 for feeding the hydraulic motor and/or the hydraulic swivel 114.

Finally, it should be understood that the invention is not limited to the embodiments described above, but also relates to and incorporates all embodiments within the scope of the appended independent claims.

The invention claimed is:

1. A rotator for a tool, the rotator comprising:
   a stator;
   a rotor rotatably arranged inside the stator, the rotor comprising a radial bearing having a first axial extension in the rotor;
   a separate bearing arranged radially outside the rotor, the separate bearing being configured to carry an external load of the rotator;
   one or more hydraulic chambers arranged between the rotor and the stator, each hydraulic chamber having a second axial extension in the rotor, wherein the second axial extension is less than the first axial extension; and
   a hydraulic swivel and an electrical swivel and/or an angle meter arranged inside the rotor, wherein the hydraulic swivel and the electrical swivel and/or the angle meter at least partially extends axially in the second axial extension in the rotor, and wherein the hydraulic swivel is axially aligned with the electrical swivel and/or the angle meter inside the rotor along the axis of rotation of the rotor.

2. The rotator according to claim 1, wherein the separate bearing at least partially extends axially in the first axial extension in the rotor.

3. The rotator according to claim 1, wherein the separate bearing at least partially extends axially in the second axial extension in the rotor.

4. The rotator according to claim 1, wherein the separate bearing is arranged radially outside the one or more hydraulic chambers.

5. The rotator according to claim 1, comprising both the electrical swivel and the angle meter, wherein the angle meter is arranged axially above the electrical swivel inside the rotor.

6. The rotator according to claim 5, wherein the electrical swivel and the angle meter are axially aligned with each other inside the rotor along an axis of rotation of the rotor.

7. The rotator according to claim 5, wherein the electrical swivel and the angle meter are arranged in a common housing inside the rotor.

8. The rotator according to claim 1, wherein the hydraulic swivel is arranged axially above the electrical swivel and/or the angle meter inside the rotor.

9. The rotator according to claim 8, wherein the hydraulic swivel is axially aligned with the electrical swivel and/or the angle meter inside the rotor along an axis of rotation of the rotor.

10. The rotator according to claim 1, comprising torque transfer means arranged radially around a section of the rotor which axially extends outside of the stator.

11. The rotator according to claim 10, wherein the section of the rotor axially extends outside of the stator in the lower part of the rotor.

* * * * *